United States Patent
Ishizaki et al.

(10) Patent No.: US 9,995,484 B2
(45) Date of Patent: Jun. 12, 2018

(54) DAMPER OPENING/CLOSING MECHANISM AND COOKING DEVICE WITH SAME

(71) Applicant: SHARP KABUSHIKI KAISHA, Osaka-shi, Osaka (JP)

(72) Inventors: Kohichi Ishizaki, Osaka (JP); Masayuki Uno, Osaka (JP)

(73) Assignee: SHARP KABUSHIKI KAISHA, Osaka-shi, Osaka (JP)

( * ) Notice: Subject to any disclaimer, the term of this patent is extended or adjusted under 35 U.S.C. 154(b) by 596 days.

(21) Appl. No.: 14/380,154

(22) PCT Filed: Jun. 26, 2013

(86) PCT No.: PCT/JP2013/067520
§ 371 (c)(1),
(2) Date: Aug. 21, 2014

(87) PCT Pub. No.: WO2014/003059
PCT Pub. Date: Jan. 3, 2014

(65) Prior Publication Data
US 2015/0034068 A1    Feb. 5, 2015

(30) Foreign Application Priority Data
Jun. 26, 2012  (JP) .................. 2012-143377

(51) Int. Cl.
| F23L 13/02 | (2006.01) |
| F16K 31/44 | (2006.01) |
| F16K 1/16 | (2006.01) |
| F24C 15/32 | (2006.01) |
| H05B 6/64 | (2006.01) |
| H05B 6/72 | (2006.01) |

(52) U.S. Cl.
CPC ............... *F23L 13/02* (2013.01); *F16K 1/16* (2013.01); *F16K 31/44* (2013.01); *F24C 15/325* (2013.01); *H05B 6/645* (2013.01); *H05B 6/6479* (2013.01); *H05B 6/725* (2013.01)

(58) Field of Classification Search
CPC . F16K 1/00; F16K 1/16; F16K 1/2007; F16K 31/44; F23L 13/02; H05B 6/645; H05B 6/6479; H05B 6/725; F24C 15/325
USPC ................................. 126/285 R; 251/129.11
See application file for complete search history.

(56) References Cited

U.S. PATENT DOCUMENTS 4,981,283 A    1/1991   Bradshaw et al.

FOREIGN PATENT DOCUMENTS

| EP | 0463726 A2 * | 1/1992 | ............. H05B 6/642 |
| EP | 1138992 A2 * | 10/2001 | ......... B60H 1/00485 |
| JP | 4-136656 A | 5/1992 | |
| JP | 04136656 A * | 5/1992 | |

(Continued)

*Primary Examiner* — Alfred Basichas
(74) *Attorney, Agent, or Firm* — Birch, Stewart, Kolasch & Birch, LLP

(57) ABSTRACT

A damper opening/closing mechanism includes: a damper which swings about a shaft to open and close a flow passage; an actuating lever which swings so as to swing the damper about the shaft; a reciprocating part which moves reciprocatively; and elastic members which are attached to the reciprocating part and positioned on forward-and-backward both sides in a swinging direction of the actuating lever and moreover which elastically bias the actuating lever along with reciprocative motions of the reciprocating part.

5 Claims, 10 Drawing Sheets

(56) References Cited

FOREIGN PATENT DOCUMENTS

| | | | |
|---|---|---|---|
| JP | 4-82647 | U | 7/1992 |
| JP | 8-6189 | Y2 | 7/1992 |
| JP | 7-208790 | A | 8/1995 |
| JP | 07208790 | A * | 8/1995 |
| JP | 9-126464 | A | 5/1997 |
| JP | 3115177 | B2 | 12/2000 |
| JP | 2003290035 | A * | 10/2003 |
| JP | 2011-21864 | A | 2/2011 |

* cited by examiner

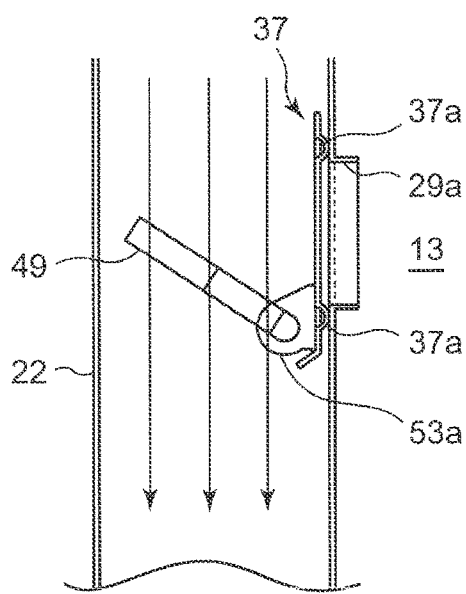
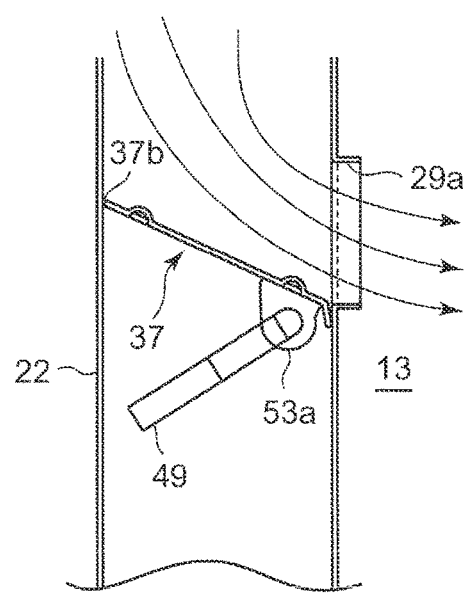

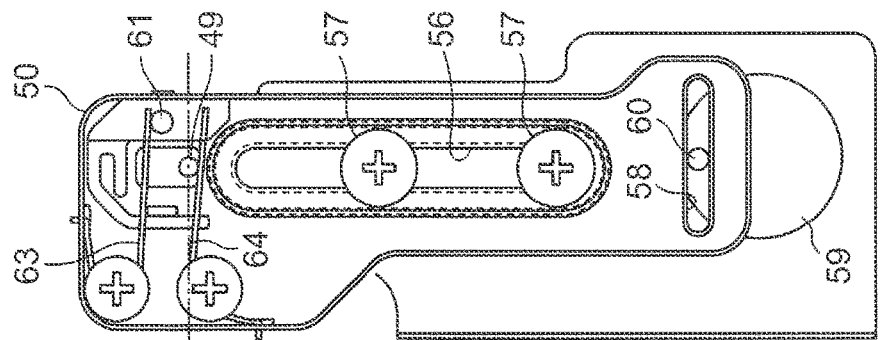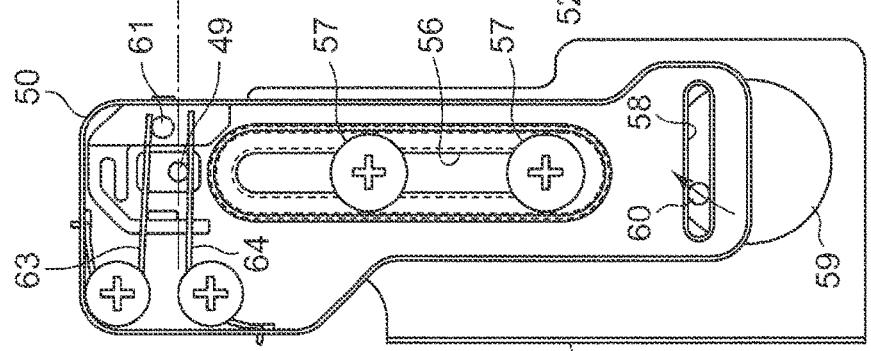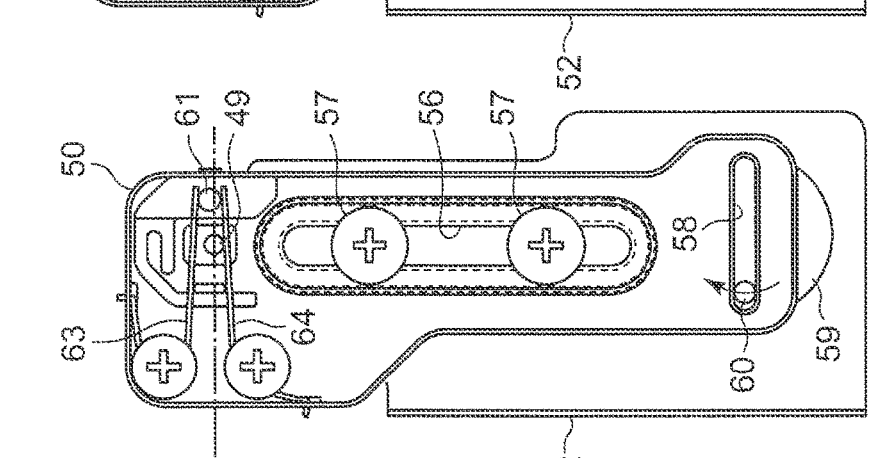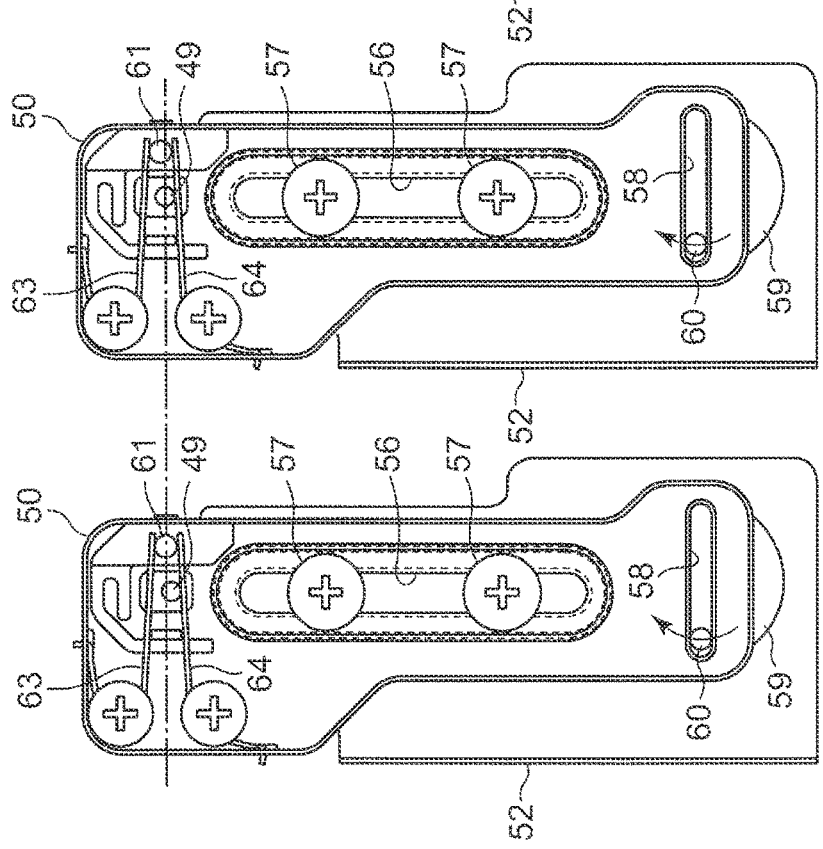

DAMPER OPENING/CLOSING MECHANISM AND COOKING DEVICE WITH SAME

TECHNICAL FIELD

The present invention relates to a damper opening/closing mechanism suitable for opening and closing of a damper provided within a hot air flow passage under a high temperature environment, as well as to a cooking device equipped with the damper opening/closing mechanism.

BACKGROUND ART

Conventionally, there has been provided a cooking device of a hot-air circulation type capable of two-stage cooking with two trays set up in a heating chamber (see, e.g., JP 2011-21864 A (PTL1)).

Unfortunately, this cooking device has a drawback that since hot air circulates in the whole heating chamber in either one-stage cooking or two-stage cooking, even one-stage cooking of smaller food quantities involves heating time nearly equal to that for two-stage cooking, making it impossible to shorten the heating time of one-stage cooking.

Accordingly, it is conceivable that in a cooking device capable of two-stage cooking, for the purpose of shortening the heating time for one-stage cooking than for two-stage cooking by efficiently circulating a heating medium during the one-stage cooking, a damper is provided on the circulation path of the heating medium so that an upper blowoff hole for blowoff to an upper region in the heating chamber is opened and closed by the damper.

In this case, however, the circulation path comes to high temperatures of 100° C. or higher due to the flow of a high-temperature heating medium inside the path. Therefore, the damper itself provided in the circulation path also comes to high temperatures. This involves a need that a motor for opening and closing the damper be installed at a position apart from the damper, making it difficult to make up a compact opening/closing mechanism. Thus, the mounting position of the opening/closing mechanism is varied among individual cooking devices, causing a difficulty in fulfilling secure opening/closing operations, as a problem.

Also, packings are needed to reduce collision noise against the circulation path or a wall surface of the heating chamber upon opening and closing of the damper or to close the upper blowoff hole. However, because the damper comes to high temperatures and high humidities as described above, rubber or other packings cannot be used as another problem.

CITATION LIST

Patent Literature

PTL1: JP 2011-21864 A

SUMMARY OF INVENTION

Technical Problem

Accordingly, an object of the invention is to provide a damper opening/closing mechanism capable of fulfilling secure opening/closing operations of the damper even in cases where the mounting position of the damper is varied among individual devices and also capable of reducing collision noise, as well as to provide a cooking device equipped with this damper opening/closing mechanism.

Solution to Problem

In order to solve the problem, a damper opening/closing mechanism according to the invention comprises:

a damper which swings about a shaft to open and close a flow passage;

an actuating lever which swings so as to swing the damper about the shaft;

a reciprocating part which moves reciprocatively; and elastic members which are attached to the reciprocating part and positioned on forward-and-backward both sides in a swinging direction of the actuating lever and moreover which elastically bias the actuating lever along with reciprocative motions of the reciprocating part.

In this damper opening/closing mechanism, elastic members for elastically biasing the actuating lever along with reciprocation of the reciprocating part are provided on forward-and-backward both sides in the swinging direction of the actuating lever in the reciprocating part. Accordingly, when the damper fully closes and opens the flow passage, the elastic force of the elastic members can be made to act on the actuating lever. Therefore, even if there arises a positional gap between the center of the reciprocation range of the reciprocating part and the center of the swing range of the damper during the assembly, any operational gap between the reciprocating part and the damper due to the positional gap can be absorbed by deformation of the elastic members.

That is, according to this invention, even if there arises a gap between the reciprocation range of the reciprocating part and the swing range of the damper during the assembly, the damper can fully close and open the flow passage. As a result, even in cases where the mounting position of the damper opening/closing mechanism is varied among individual devices, it is implementable to fulfill secure opening/closing operations of the damper.

Furthermore, the actuating lever is elastically biased by the elastic members. Therefore, impacts resulting when the damper fully closes and opens the flow passage can be relaxed by elastic force of the elastic members, by which collision noise of the damper against the flow passage can be reduced.

Furthermore, the actuating lever is elastically biased by the elastic members. Therefore, even if the damper is in contact with the flow passage at places near the dead centers of rotational motion or reciprocative motion of the power unit in the reciprocating part, the reciprocating part can continue to be moved forward or backward by virtue of deformation of the elastic members. Thus, when the damper fully closes and opens the flow passage, overloads on the power unit and resultant occurrence of failures can be prevented.

Also, in the damper opening/closing mechanism of one embodiment, the reciprocating part is a slider which is reciprocatively moved in a rectilinear direction under guide by guide portions.

According to this embodiment, since the reciprocating part is constituted by the slider, the reciprocating part can be made thinner in thickness and smaller in size enough to be installed even in a narrow space.

Also, in the damper opening/closing mechanism of one embodiment, the elastic members are torsion springs.

According to this embodiment, since the elastic members are implemented by torsion springs, the reciprocating part can be formed thinner in thickness and smaller in size.

Also, in the damper opening/closing mechanism of one embodiment, a body of the reciprocating part has a hole through which the actuating lever is to be inserted with a gap thereagainst in the swinging direction of the actuating lever, and moreover has a stopper pin for positioning the two torsion spring with gaps against the actuating lever inserted into the hole when the actuating lever is inserted into the hole.

According to this embodiment, the stopper pin is employed to fulfill the positioning for positions where the two torsion springs elastically bias the actuating lever along with the reciprocation of the reciprocating part. Therefore, the timing at which the torsion springs act on the actuating lever can be set to an optimum timing for the damper to close and open the flow passage.

Also, in the damper opening/closing mechanism of one embodiment, the torsion springs bias the body of the reciprocating part so as to be kept from separating apart from the stopper pin in an axial direction of the stopper pin.

According to this embodiment, the torsion springs are kept from separating apart from the stopper pin. Therefore, even if the reciprocating part is vibrated during reciprocating motion, the torsion springs are never separated apart from the stopper pin, so that operations of the stopper pin and the torsion springs can securely be fulfilled.

Also, the damper opening/closing mechanism of one embodiment further comprises:

a cam mechanism for converting rotational motion of a shaft of a motor into reciprocative motion in a rectilinear direction of the slider.

According to this embodiment, the slider can be reciprocated in a rectilinear direction by the motor.

Also, a cooking device according to the invention comprises:

a heating chamber for accommodating and heating a heating object to be heated;

a heating medium generation part for generating a heating medium to be supplied to the heating chamber;

a flow passage through which the heating medium flows; and the damper opening/closing mechanism as defined in the above, wherein the damper of the damper opening/closing mechanism opens and closes the flow passage.

This cooking device includes the damper opening/closing mechanism by which even if there arises a gap between the reciprocation range of the reciprocating part and the swing range of the damper, the damper can fully close and open the flow passage. Therefore, the damper itself that opens and closes the flow passage, through which the heating medium flows, also comes to high temperatures, so that the damper opening/closing mechanism may well be installed at a position apart from the damper. In such cases, even if the mounting position of the damper opening/closing mechanism is varied among individual cooking devices and, as a result, there has arisen a gap between the reciprocation range of the reciprocating part and the swing range of the damper due to the variations in the mounting position, it is implementable to fulfill secure opening/closing operations of the damper.

Furthermore, the actuating lever is elastically biased by the damper opening/closing mechanism. Therefore, even without providing any packing, collision noise occurring upon opening and closing of the damper can be reduced.

Advantageous Effects of Invention

As apparent from the above description, in the damper opening/closing mechanism of this invention, elastic members for elastically biasing the actuating lever along with reciprocation of the reciprocating part are provided on both sides in the swinging direction of the actuating lever in the reciprocating part. Accordingly, when the damper closes and opens the flow passage, the elastic force of the elastic members can be made to act on the actuating lever. Therefore, even if there arises a positional gap between the center of the reciprocation range of the reciprocating part and the center of the swing range of the damper during the assembly, any operational gap between the reciprocating part and the damper due to the positional gap can be absorbed by deformation of the elastic members.

Furthermore, the actuating lever is elastically biased by the elastic members. Therefore, impacts resulting when the damper closes and opens the flow passage can be relaxed by elastic force of the elastic members, by which collision noise of the damper against the flow passage can be reduced.

Furthermore, the actuating lever is elastically biased by the elastic members. Therefore, even if the damper is in contact with the flow passage at places near the dead centers of rotational motion or reciprocative motion of the power unit in the reciprocating part, the reciprocating part can continue to be moved forward or backward by virtue of deformation of the elastic members. Thus, when the damper fully closes and opens the flow passage, overloads on the power unit and resultant occurrence of failures can be prevented.

That is, according to this invention, even in cases where the mounting position of the damper opening/closing mechanism is varied among individual devices during the assembly, it is implementable to fulfill muffling of the damper as well as secure opening/closing operations of the damper without using any packing for muffling and sealing use.

Also, the cooking device of this invention includes the damper opening/closing mechanism by which even upon occurrence of a gap between the reciprocation range of the reciprocating part and the swing range of the damper, the damper can fully close and open the flow passage. The damper itself, which opens and closes the flow passage through which the heating medium flows, comes to high temperatures. Therefore, in cases where the damper opening/closing mechanism is installed at a position apart from the damper, even if the mounting position of the opening/closing mechanism is varied among individual cooking devices, it is implementable to fulfill secure opening/closing operations of the damper. Moreover, even without providing any packings, collision noise upon opening and closure of the damper can be reduced.

BRIEF DESCRIPTION OF DRAWINGS

FIG. 9(a) is a sectional view showing the damper-closed state, and FIG. 9(b) is a sectional view showing its opened state;

FIG. 10(a) is a view showing a state of the slider and torsion springs at a time point of slide start in a case where the slider slides upward, FIG. 10(b) is a view at a time point at which the slider slides further upward, FIG. 10(c) is a view at a time point at which the slider slides further upward, and FIG. 10(d) is a view at a time point at which the slider is placed at the uppermost position.

DESCRIPTION OF EMBODIMENTS

Hereinbelow, the present invention will be described in detail by way of embodiments thereof illustrated in the accompanying drawings. The following embodiment will be described on a case where the damper opening/closing mechanism of this invention is applied to a cooking device as an example.

Figure 1:
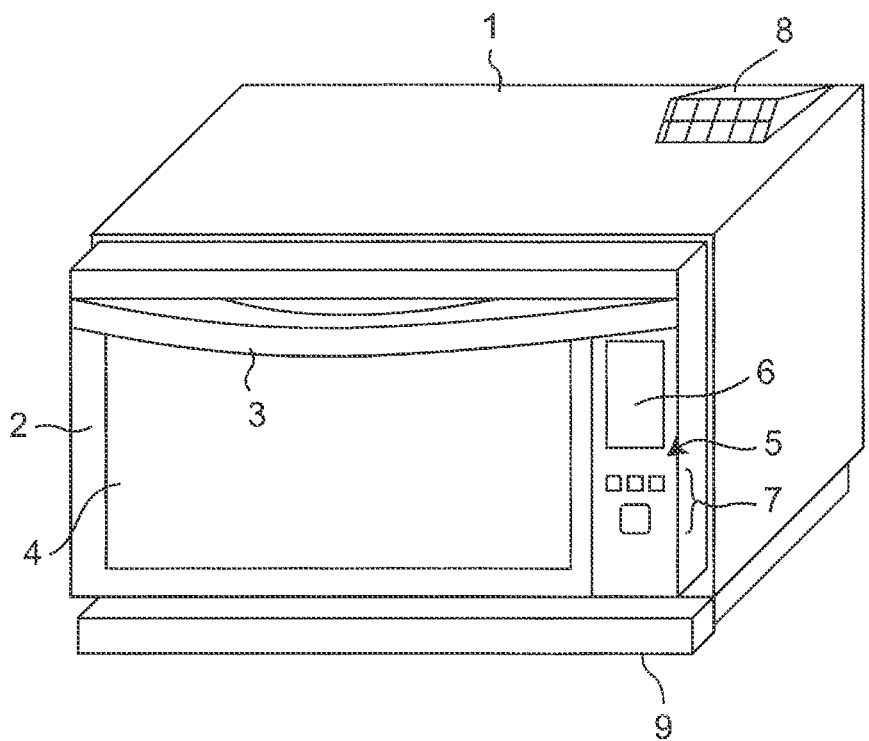
FIG. 1 is a front perspective view of a cooking device to which a damper opening/closing mechanism of this invention is applied.

FIG. 1 is a front perspective view of a cooking device to which a damper opening/closing mechanism of this embodiment is applied. As shown in FIG. 1, in this cooking device, a door 2 is attached at a front of a rectangular parallelepiped-shaped casing 1 so as to be pivotable generally about a lower-end side line thereof. A handle 3 is attached at an upper portion of the door 2, and a heat-resistant glass 4 is attached at a generally center of the door 2. An operation panel 5 is provided on the right side of the door 2 as in the figure. The operation panel 5 has a color LCD (Liquid Crystal Display) part 6 and a button group 7. An exhaust duct 8 is provided at a right-side rear of a top face of the casing 1. Further, a dew receiving container 9 is removably attached below the door 2 of the casing 1.

In this case, the color LCD part 6 is made up by superimposing a touch panel on a color liquid crystal panel, so that a user is enabled to select menu images or the like displayed on the color liquid crystal panel by touching the touch panel. In addition, in this invention, without being limited to the color liquid crystal panel, organic ELs or other display devices may also be used, and those of black-and-white display are usable as well.

Figure 2:
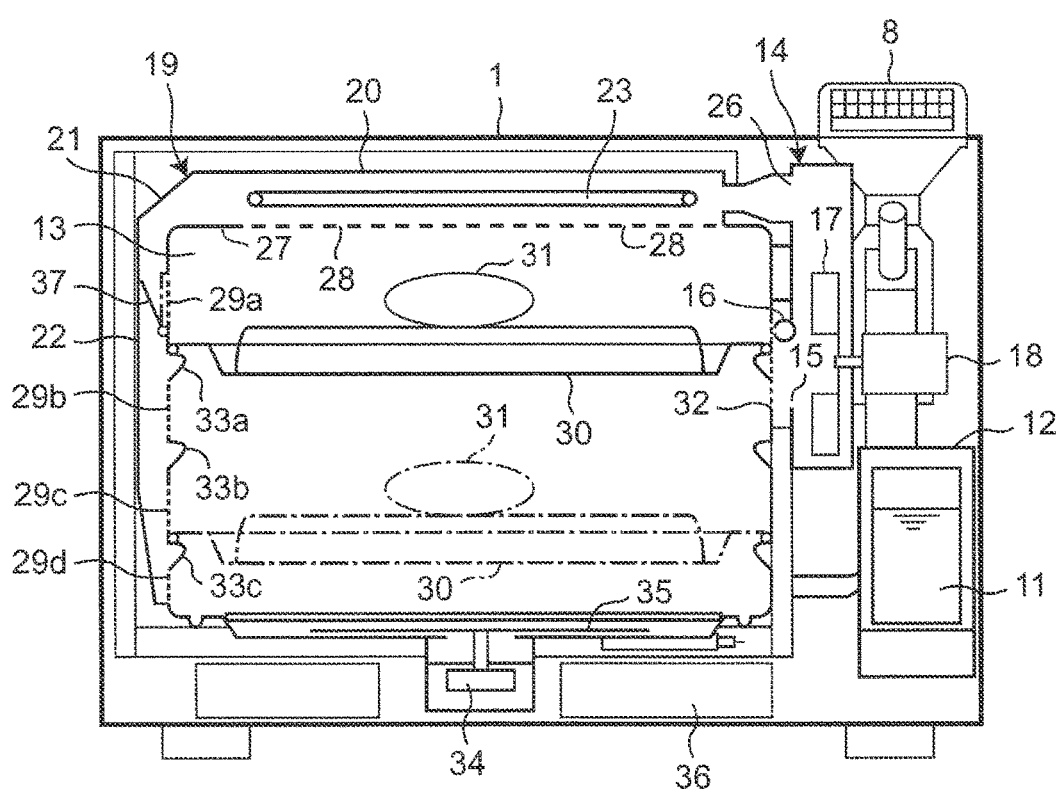
FIG. 2 is a longitudinal sectional view of the cooking device shown in FIG. 1.

FIG. 2 is a schematic view of a longitudinal cross section of the cooking device shown in FIG. 1, as viewed from the door 2 side (front side). As shown in FIG. 2, the cooking device heats water supplied from a water tank 11 by a steam generator 12 to generate saturated steam. Saturated steam generated by the steam generator 12 is supplied via a steam supply passage (not shown) to a heating chamber 13 side of a steam inlet port 15 in a circulation unit 14 attached on the right side face of the heating chamber 13 as in the figure, and then jetted out from a steam supply pipe 16 connected to the steam supply passage.

The steam supply pipe 16 is attached at a proximity of the steam inlet port 15 in the circulation unit 14 so as to be parallel to the right side face of the heating chamber 13. Also, within the circulation unit 14, a circulation fan 17 to be rotationally driven by a circulation fan motor 18 is placed so as to face the steam inlet port 15.

A steam duct 19 bent in an L shape is provided so as to cover the top face and the right side face of the heating chamber 13 as in the figure. The steam duct 19 includes a first duct portion 20 fixed to the top face of the heating chamber 13, a bent portion 21 bent downward from the left side of the first duct portion 20, and a second duct portion 22 fixed to the left side face of the heating chamber 13 and adjoining the first duct portion 20 via the bent portion 21.

A superheated steam generation heater 23 is accommodated in the first duct portion 20 of the steam duct 19. The superheated steam generation heater 23 and the steam generator 12 constitute the heating medium generation part.

The right side of the first duct portion 20 in the steam duct 19 as in the figure is communicated with a steam supply port 26 provided at an upper portion of the circulation unit 14. A plurality of first steam jet ports 28 are provided in a top plate 27 of the heating chamber 13, and the first duct portion 20 of the steam duct 19 is communicated with inside of the heating chamber 13 via the first steam jet ports 28. Meanwhile, the second duct portion 22 in the steam duct 19 is communicated with inside of the heating chamber 13 via a plurality of second steam jet ports 29a, 29b, 29c, 29d provided in the left side face of the heating chamber 13.

A gap between the heating chamber 13 and the steam duct 19 is sealed with heat-resistant resin or the like. Also, the heating chamber 13 and the steam duct 19 except the front opening of the heating chamber 13 are covered with heat insulating material.

In addition, on right-and-left side faces of the heating chamber 13, engaging portions 33a, 33b, 33c for engaging with both end portions of a tray 30 are provided in three stages in the vertical direction.

The circulation unit 14, the first duct portion 20, the heating chamber 13, and connection members that connect those members make up a steam circulation path as an example of the flow passage. Then, saturated steam generated by the steam generator 12 is supplied to a border portion of the circulation unit 14 with the heating chamber 13 in the circulation path.

Also, an unshown magnetron is placed in lower part of the heating chamber 13. Microwaves generated by the magnetron are led to a lower center of the heating chamber 13 by a waveguide (not shown). The microwaves, while being stirred by a rotating antenna 35 driven by a motor 34, are radiated upward in the heating chamber 13 so as to heat a heating object 31 to be heated.

A cooling fan (not shown) and electrical components 36 are placed on the lower side within the casing 1. The electrical components 36 have a control unit including a drive circuit for driving individual parts of the cooking device, a control circuit for controlling the drive circuit, and the like.

A damper 37 having a fulcrum on the wall surface of the heating chamber 13 and acting for opening and closing the second steam jet port 29a is provided at an upper portion of the uppermost-stage engaging portion 33a in the second duct portion 22 and at a lower portion of the uppermost-stage second steam jet port 29a. In this case, the interior of the second duct portion 22 and the damper 37 are generally equal in length to each other in the back-and-forth direction of the cooking device. Then, when the damper 37 has opened the second steam jet port 29a, the peripheral edge of the damper 37 comes into generally close contact with the inner surface of the second duct portion 22. Therefore, opening the second steam jet port 29*a* by the damper 37 causes the second duct portion 22 to be resultantly closed by the damper 37.

Further, both end portions of the tray 30 are engaged with the engaging portions 33*a*, by which interior of the heating chamber 13 is partitioned into an upper region on the upper side of the tray 30 and a lower region on the lower side of the tray 30. Therefore, after the tray 30 is engaged with the uppermost-stage engaging portions 33*a*, the damper 37 opens the second steam jet port 29*a* so that the steam duct 19 is communicated with generally only the above-mentioned upper region of the heating chamber 13.

Figure 3:
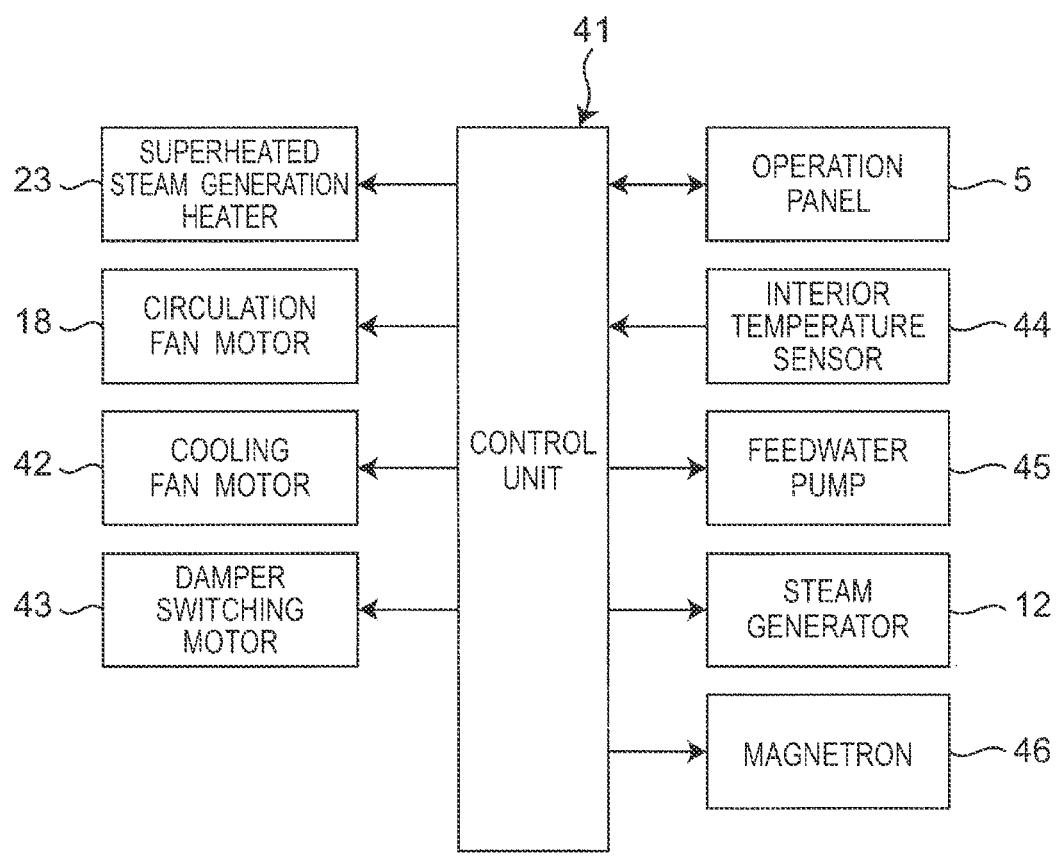
FIG. 3 is a control block diagram of the cooking device shown in FIG. 2.

FIG. 3 shows a circuit block diagram of the cooking device. In this cooking device, the control unit 41 composed of a microcomputer, input/output circuits and the like is contained in the electrical components 36 (shown in FIG. 2). Connected to the control unit 41 are the superheated steam generation heater 23, the circulation fan motor 18, a cooling fan motor 42, a damper switching motor 43, the operation panel 5, an interior temperature sensor 44, a feedwater pump 45, the steam generator 12 and the magnetron 46. Then, based on a signal from the operation panel 5 and a detection signal from the interior temperature sensor 44, the control unit 41 controls the superheated steam generation heater 23, the circulation fan motor 18, the cooling fan motor 42, the damper switching motor 43, the operation panel 5, the feedwater pump 45, the steam generator 12, the magnetron 46, and the like.

With the cooking device constituted as described above, when a heat cooking is executed with superheated steam, the steam generator 12 shown in FIG. 2 is driven so that the superheated steam generation heater 23 is turned on while the circulation fan 17 is driven into rotation. Then, saturated steam supplied from the steam generator 12 to the upstream-side proximity of the steam inlet port 15 in the circulation unit 14 is sucked through the steam inlet port 15 into the circulation unit 14 having a negative pressure due to the rotation of the circulation fan 17. Thus, saturated steam that has merged with a circulating air flow that circulates along the steam circulation path formed by the circulation unit 14, the first duct portion 20, the heating chamber 13 and connecting members that connect those members is blown off through the steam supply port 26 into the first duct portion 20. Then, that saturated steam is heated by the superheated steam generation heater 23 in the first duct portion 20 so as to become superheated steam. Part of the superheated steam is jetted out downward in the heating chamber 13 from the plurality of first steam jet ports 28 provided in the top plate 27 of the lower-side heating chamber 13. Also, another part of the superheated steam is jetted out through the second steam jet ports 29*a*, 29*b*, 29*c*, 29*d* of the heating chamber 13 via the steam duct 19 into the heating chamber 13.

In this case, as shown by solid line in FIG. 2, in a one-stage cooking in which the tray 30 is set on the upper stage in the heating chamber 13, the damper 37 is driven by the damper switching motor 43 so that the uppermost-stage second steam jet port 29*a* is opened while passages to the second steam jet ports 29*b*, 29*c*, 29*d* in the second duct portion 22 are closed. As a result of this, the heating object 31 mounted on the upper-stage tray 30 is heated by both radiant heat of the superheated steam generation heater 23 placed on the upper side of the heating chamber 13 and superheated steam jetted out from the first steam jet ports 28 and superheated steam jetted out from the second steam jet port 29*a*.

Meanwhile, in a two-stage cooking in which the tray 30 is set also on the lower stage in the heating chamber 13 as shown by one-dot chain line in FIG. 2 so that the cooking is performed in upper-and-lower two stages of the upper stage shown by solid line and the lower stage shown by one-dot chain line, the damper 37 is driven by the damper switching motor 43 so that the second steam jet port 29*a* is closed as shown by one-dot chain line while the passages to the second steam jet ports 29*b*, 29*c*, 29*d* in the second duct portion 22 are opened. As a result of this, the heating object 31 mounted on the upper-stage tray 30 is heated by both radiant heat of the superheated steam generation heater 23 placed on the upper side of the heating chamber 13 and superheated steam jetted out from the first steam jet ports 28. Also, the heating object 31 mounted on the lower-stage tray 30 is heated by superheated steam jetted out from the second steam jet ports 29*b*, 29*c*, 29*d*.

Then, superheated steam supplied into the heating chamber 13, after having heated the heating objects 31 mounted on the upper-and-lower two-stage trays 30, is sucked into the circulation unit 14 through an inlet port 32 which is formed in the right wall surface of the heating chamber 13 so as to face the steam inlet port 15 of the circulation unit 14. Then, the superheated steam passes along the circulation path again to return into the heating chamber 13, and such circulation is repeated.

In addition, the cooling fan motor 42 is driven when air for cooling the electrical components 36 is taken in. Also, the interior temperature sensor 44 detects a temperature in the heating chamber 13 for execution of heat cooking. The feedwater pump 45 is driven when water is supplied from the water tank 11 to the steam generator 12. The magnetron 46 is driven when the heating object 31 is heated with microwaves.

Now the damper 37 and the damper opening/closing mechanism to be driven by the damper switching motor 43 to open and close the damper 37 will be described in detail below.

Figure 4:
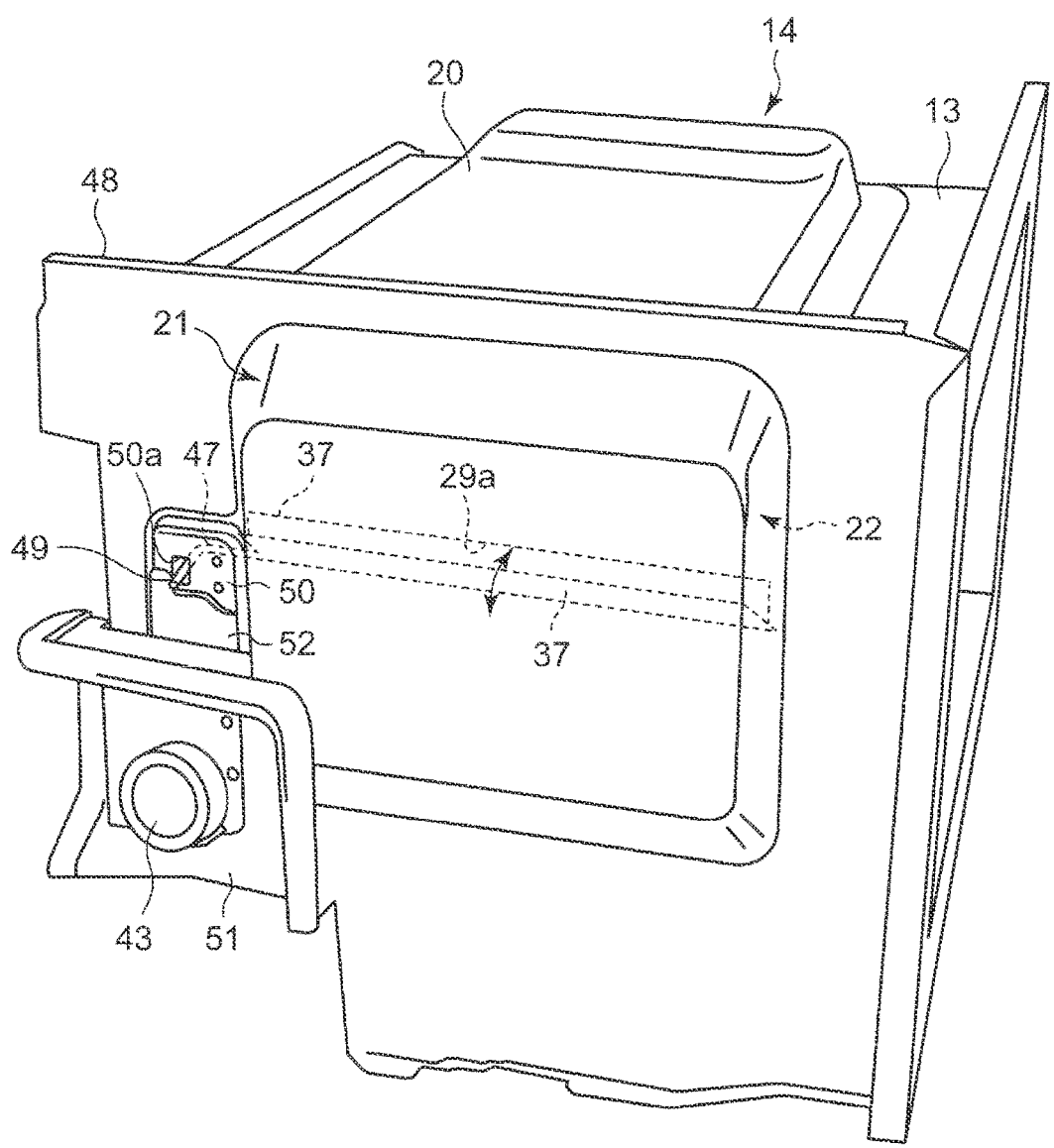
FIG. 4 is a perspective view of the cooking device with its casing removed, as viewed from a second duct portion side.

FIG. 4 is a perspective view of the cooking device with its casing 1 removed, as viewed from the second duct portion 22 side. In FIG. 4, the damper 37 is placed so as to extend horizontally in the second duct portion 22, and a right end portion of the damper 37 as seen in the figure is pivotably held by a rotating shaft (not shown) provided on the wall surface side of the heating chamber 13. Similarly, a left-side end portion as in the figure is pivotably held by a rotating shaft 47. Then, the rotating shaft 47 passes on the back side of a side panel 48 that covers side faces of the heating chamber 13 and the second duct portion 22 so as to extend leftward as in the figure, while a fore end portion of the rotating shaft 47 is generally perpendicularly bent outward so as to form an actuating lever 49. This actuating lever 49 projects outward through a hole (not shown) provided in the side panel 48.

The actuating lever 49 is inserted into a hole 50*a* of a slider 50 which is mounted on the side panel 48 so as to be up/down slidable as will be detailed later. Thus, as the slider 50 slides up and down against the side panel 48, the actuating lever 49 swings about the rotating shaft 47, where pivoting of the rotating shaft 47 causes the damper 37 to swing, thereby opening and closing the second steam jet port 29*a*.

The slider 50 is up/down slidably mounted on the slider mounting plate 52 attached via a motor mounting plate 51 to the side panel 48. Then, provided in the lower part of the slider 50 is a cam mechanism by which rotational motion of a pin (not shown) rotated by the damper switching motor 43 mounted on the motor mounting plate 51 is converted to up/down motion, as will be detailed later. Thus, the slider 50 is driven by the damper switching motor 43 so as to slide up and down. As a result, the actuating lever 49 is swung so that the damper 37 opens and closes the second steam jet port 29a.

Figure 5:
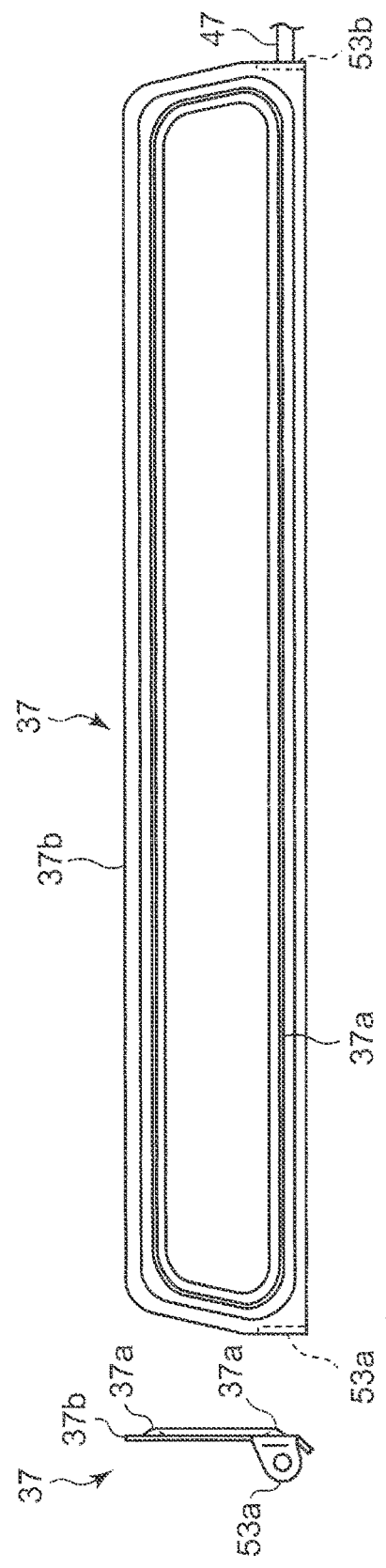
FIG. 5(a) is a plan view of a damper in FIG. 4.
FIG. 5(b) is a side view thereof.

FIGS. 5(b) and 5(a) are a plan view (FIG. 5(b)) and a side view (FIG. 5(a)) of the damper 37. As described before, the left-right length of the damper 37 as in FIG. 5(b) is generally equal to the left-right length of the second duct portion 22 as in FIG. 4 so that peripheral edge of the damper 37 can be put into generally close contact with the inner surface of the second duct portion 22, making it possible to close the second duct portion 22. At the left-side end portion of the damper 37 as in FIG. 5(b), a bearing 53a is provided which is generally perpendicular to the surface of the damper 37 and through which a rotating shaft (not shown) provided on the wall surface side of the heating chamber 13 is to be inserted. Also, at the right-side end portion of the damper 37 as in FIG. 5(b), a bearing 53b is provided to which one end of the rotating shaft 47 installed on the wall surface side of the heating chamber 13 is fitted.

Also, in the heating chamber 13-side surface of the damper 37, an annular projective portion 37a is formed so as to have a configuration extending along the perimeter of the second steam jet port 29a and to project toward the heating chamber 13. When the damper 37 closes the second steam jet port 29a, the projective portion 37a comes into close contact with the perimeter of the second steam jet port 29a so as to close the second steam jet port 29a.

Thus, the damper 37 is pivotably held on the rotating shaft provided on the wall surface side of the heating chamber 13 so that with the second steam jet port 29a opened, the peripheral edge including a fore end edge 37b of the damper 37 is put into close contact with the inner surface of the second duct portion 22, thereby closing the second duct portion 22. Meanwhile, with the second duct portion 22 opened, the annular projective portion 37a is put into close contact with the perimeter of the second steam jet port 29a, thus closing the second steam jet port 29a.

In this embodiment, one end of the rotating shaft 47 is fitted to the bearing 53b at the right-side end portion of the damper 37 as in FIG. 5(b). However, it is also allowable that the rotating shaft 47 is inserted therethrough as in the case of the bearing 53a while the actuating lever for swinging the damper 37 is provided on a rotating shaft other than the rotating shaft 47. In essence, the damper 37 needs only to be swingable about the rotating shaft 47.

Figure 6:
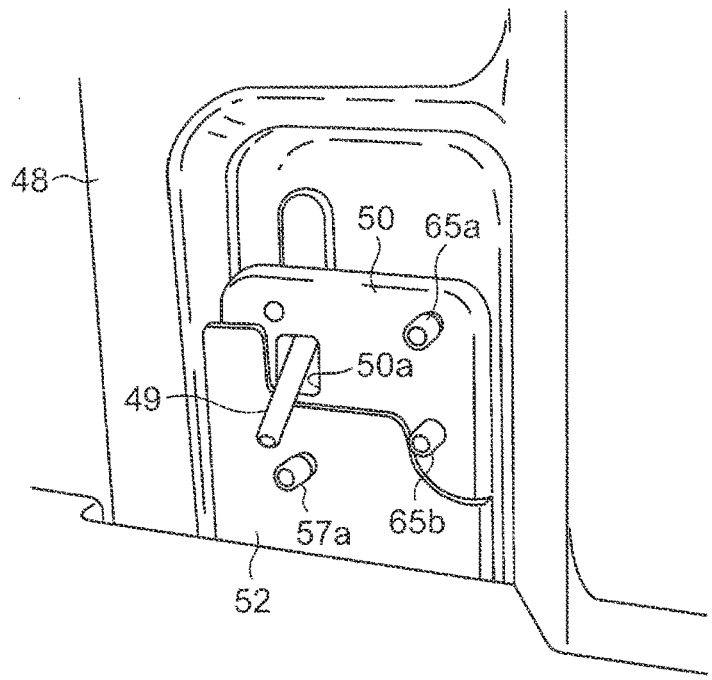
FIG. 6 is an enlarged view of a slider while the damper is opened.
Figure 7:
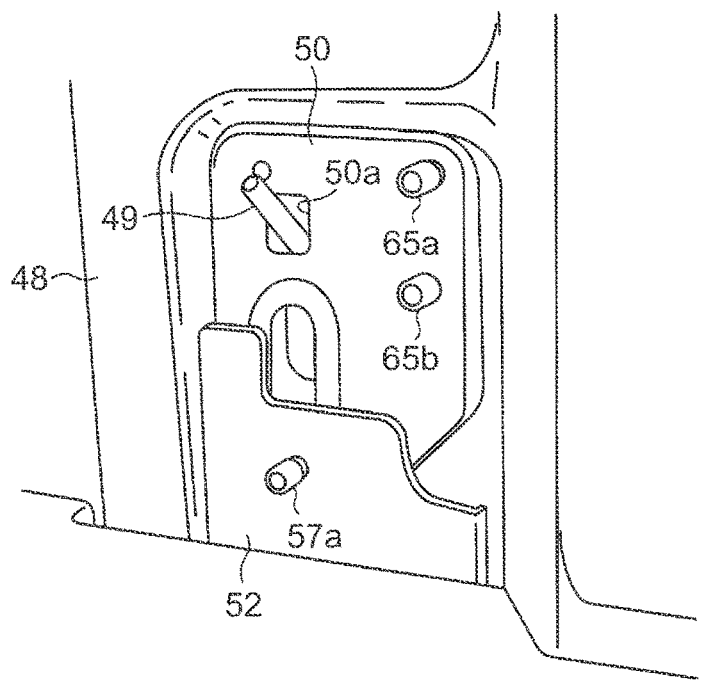
FIG. 7 is an enlarged view of the slider while the damper is closed.

FIGS. 6 and 7 are enlarged views of the slider 50 and the slider mounting plate 52 shown in FIG. 4. In addition, FIG. 6 shows a case where the damper 37 keeps the second steam jet port 29a open. FIG. 7 shows a case where the damper 37 keeps the second steam jet port 29a closed. As shown in FIG. 6, as the slider 50 slides downward against the side panel 48 and the slider mounting plate 52, the actuating lever 49 pivots downward about the rotating shaft 47. In this case, as can be understood from FIGS. 2 and 4, downward pivoting of the actuating lever 49 causes the damper 37 to open the second steam jet port 29a and close the second duct portion 22. Also, as shown in FIG. 7, as the slider 50 slides upward against the side panel 48 and the slider mounting plate 52, the actuating lever 49 pivots upward about the rotating shaft 47. In this case, as can be understood from FIGS. 2 and 4, upward pivoting of the rotating shaft 47 causes the damper 37 to close the second steam jet port 29a and open the second duct portion 22.

Figure 8A:
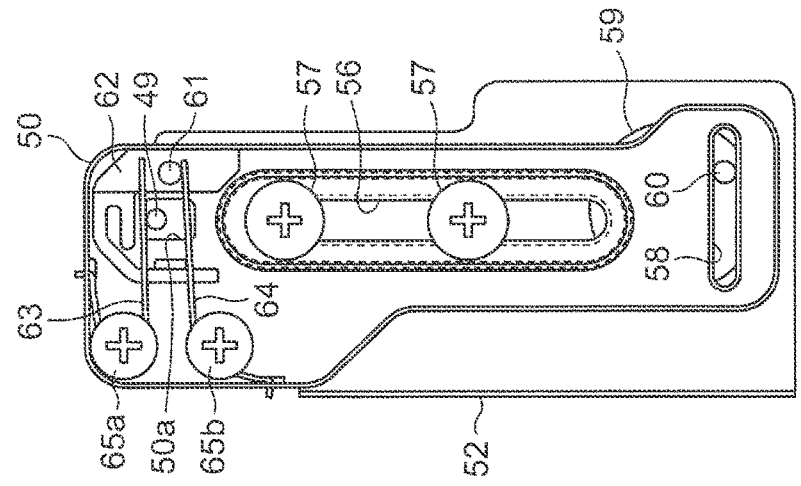
FIG. 8(a) is a view of the slider and a slider mounting plate in a damper-closed state as viewed from a rear side.
Figure 8B:
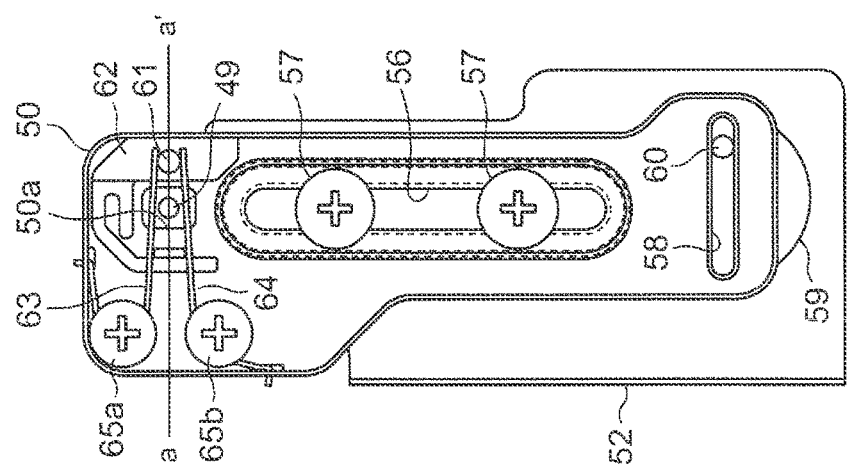
FIG. 8(b) is such a view in a damper-intermediate state.
Figure 8C:
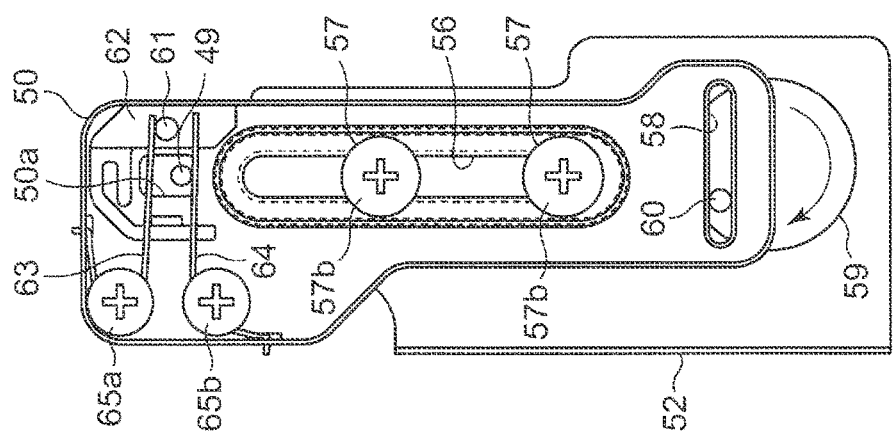
FIG. 8(c) is such a view in a damper-opened state.

FIGS. 8(a), 8(b) and 8(c) are views of the slider 50 and the slider mounting plate 52, as viewed from the rear side of FIGS. 6 and 7, for explaining operations of the slider 50 and the slider mounting plate 52. FIG. 8(a) shows a case where the damper 37 is fully closing the second steam jet port 29a. FIG. 8(c) shows a case where the damper 37 is fully opening the second steam jet port 29a. Further, FIG. 8(b) shows an intermediate case between FIG. 8(a) and FIG. 8(c).

As shown in FIGS. 8(a), 8(b) and 8(c), a vertically linear-shaped elongate hole 56 is formed at a central portion of the slider 50. The elongate hole 56 has a width which is slightly larger than a diameter of each thread portion 57a (see FIGS. 6 and 7) of two screws 57, 57 to be inserted therethrough and which is smaller than a diameter of their head portions 57b. Then, by mounting the slider 50 on the slider mounting plate 52 with use of the two screws 57, 57 so as to provide a gap therebetween, the slider 50 can be mounted on the slider mounting plate 52 so as to be slidable vertically, or up and down, along the elongate hole 56.

Also, a slot 58 is formed in lower part of the slider 50 so as to extend generally perpendicular to an extending direction of the elongate hole 56. Inserted in this slot 58 is a pin 60 which is provided on a periphery of a disc 59 coaxially fitted to a drive shaft (not shown) of the damper switching motor 43. Thus, as the disc 59 is rotationally driven by the damper switching motor 43, the pin 60 is turned. Along with this operation, the slider 50 repeats up/down motions together with the up/down motions of the pin 60. That is, in this embodiment, the disc 59 having the pin 60 and the slot 58 of the slider 50 constitute the cam mechanism.

At an upper side portion of the slider 50, a stopper pin 61 is provided so as to be erect generally vertically against the surface of the slider 50. The stopper pin 61 is formed on a mounting plate 62 which is made of resin and installed around the hole 50a of the slider 50 along the surface of the slider 50.

At the other side portion in upper part of the slider 50, referring to FIG. 8(b), torsion springs 63, 64 are mounted with screws 65a, 65b on both upper and lower sides of a line segment aa' interconnecting the stopper pin 61 and the hole 50a. The torsion spring 63 is mounted on the upper side of the line segment with the screw 65a, with its fore end portion biasing the stopper pin 61 about the screw 65a. In contrast to this, the torsion spring 64 is mounted on the lower side of the line segment with the screw 65b, with its fore end portion biasing the stopper pin 61 about the screw 65b.

The actuating lever 49 is inserted in the hole 50a of the slider 50 with a distance between the torsion spring 63 and the torsion spring 64. In addition, in FIGS. 8(a), 8(b) and 8(C), the actuating lever 49 is inserted in a direction from front to back side of the drawing sheet.

That is, in this embodiment, the reciprocating part is composed of the damper switching motor 43 and the slider 50, and the elastic members are composed of the torsion springs 63, 64.

With this constitution, in FIG. 8(b), the pin 60 of the disc 59 is positioned at an intermediate point between top dead center and bottom dead center, and the torsion spring 63 and the torsion spring 64 are located at up-and-down symmetrical positions with respect to the line segment aa' interconnecting the stopper pin 61 and the hole 50a. Then, the torsion spring 63 and the torsion spring 64 are biasing the stopper pin 61 from upward and downward with equal elastic force.

Also in FIG. 8(a), as the slider 50 is pushed up by the pin 60 from the state of FIG. 8(b), the actuating lever 49 is pushed up by the lower-side torsion spring 64. Thus, as shown in FIG. 9(a), the projective portion 37a of the damper 37 comes into close contact with the perimeter of the second steam jet port 29a so as to fully close the second steam jet port 29a.

Also in FIG. 8(c), as the slider 50 is pushed down by the pin 60 from the state of FIG. 8(b), the actuating lever 49 is pushed down by the upper-side torsion spring 63. Thus, as shown in FIG. 9(b), the damper 37 opens the second steam jet port 29a while the perimeter of the damper 37 including the fore end edge 37b comes into close contact with the inner surface of the second duct portion 22 so as to fully close the second duct portion 22.

FIGS. 10(a), 10(b), 10(c) and 10(d) show states of the slider 50, the stopper pin 61, the torsion spring 63 and the torsion spring 64 when the slider 50 slides upward against the slider mounting plate 52. From FIG. 10(a) toward FIG. 10(d), the slider 50 slides upward against the slider mounting plate 52.

Operations of the slider 50, the stopper pin 61, the torsion spring 63 and the torsion spring 64 will be described in detail below according to FIGS. 10(a), 10(b), 10(c) and 10(d). In this case, FIG. 10(a) shows a state that the pin 60 of the disc 59 is positioned at an intermediate point between top dead center and bottom dead center. Also, FIG. 10(b) shows a state that the pin 60 is positioned on the closure side where the actuating lever 49 is over the intermediate position of the swing range so that the second steam jet port 29a is to be closed. FIG. 10(c) shows a state that the pin 60 is positioned at a closure point where the damper 37 fully closes the second steam jet port 29a. FIG. 10(d) shows a state that the pin 60 is positioned at an overstroke point where the slider 50 is over the stroke.

That is, in this embodiment, the up/down movement range of the slider 50 by the damper switching motor 43 is set larger than a minimum up/down movement range of the actuating lever 49 necessary for the damper 37 to open and close the second steam jet port 29a, so that the slider 50 goes overstroke as shown in FIG. 10(d). By setting the up/down movement range of the slider 50 as shown above, the damper 37 can be opened and closed securely and fully by the slider 50.

First, as shown in FIG. 10(a), when the pin 60 of the disc 59 is positioned at the intermediate point, the torsion spring 63 and the torsion spring 64 are located at up-and-down symmetrical positions with respect to the line segment interconnecting the stopper pin 61 and the hole 50a, with the actuating lever 49 in contact with the lower-side torsion spring 64. In this state, as the pin 60 is moved in the arrow direction, the slider 50 is pushed up with the pin 60, so that the actuating lever 49 is positioned over the intermediate position of the swing range by the torsion spring 64 so as to be on the closure side where the second steam jet port 29a is closed as shown in FIG. 10(b). In this state, as the pin 60 is moved in the arrow direction, the slider 50 is moved up so that the actuating lever 49 is pushed up by the torsion spring 64, causing the damper 37 to close the second steam jet port 29a step by step. Thus, when the damper 37 has fully closed the second steam jet port 29a, it comes to the closure point shown in FIG. 10(c).

In this case, the actuating lever 49 is being biased by the lower-side torsion spring 64. Therefore, an impact upon contact of the projective portion 37a of the damper 37 against the wall surface of the heating chamber 13 is relaxed by elastic force of the torsion spring 64, by which collision noise of the damper 37 against the wall surface of the heating chamber 13 is reduced. This reduction of collision noise can similarly be obtained also when the actuating lever 49 is biased by the upper-side torsion spring 63 so that the fore end edge 37b of the damper 37 comes into contact with the inner surface of the second duct portion 22, causing the damper 37 to close the second duct portion 22.

Further, as described above, the up/down movement range of the slider 50 is set larger than the minimum up/down movement range of the actuating lever 49 necessary for full closure by the damper 37, so that the pin 60 has not yet reached the top dead center at the time point of FIG. 10(c). Therefore, as the pin 60 is moved in the arrow direction, the slider 50 is moved up, so that the actuating lever 49 tends to be pushed up by the lower-side torsion spring 64. However, since the damper 37 has already fully closed the second steam jet port 29a, the actuating lever 49 cannot be moved up, so that the slider 50 alone is moved up against the biasing force of the torsion spring 64 as shown in FIG. 10(d). As a result, the pin 60 can be moved in the arrow direction, that is, the damper switching motor 43 can continue to be rotated. Thus, overloads on the damper switching motor 43 and resultant occurrence of seizures can be prevented. The prevention of seizures of the damper switching motor 43 in the overstroke state can similarly be fulfilled also when the pin 60 reaches the bottom dead center.

When the damper 37 fully closes the second steam jet port 29a, the actuating lever 49 is subject to action of the elastic force of the torsion spring 64. Also, when the damper 37 fully closes the second duct portion 22, the actuating lever 49 is subject to elastic force of the torsion spring 63. Therefore, even if there arises a positional gap between the center of the up/down movement range of the slider 50 and the center of the up/down movement range of the damper 37 during the assembly, any operational gap between the slider 50 and the damper 37 due to the positional gap can be absorbed by deformation of the torsion springs 63, 64. Thus, even if there arises a gap between the up/down movement range of the slider 50 and the up/down movement range of the damper 37 during the assembly, the damper 37 can fully close the second steam jet port 29a and the second duct portion 22.

That is, according to this embodiment, even in cases where mounting positions of the damper 37 and such opening/closing mechanisms as the rotating shaft 47, the slider 50 and the slider mounting plate 52 are varied among individual cooking devices, it is implementable to fulfill secure opening/closing operations of the damper 37.

In order that above-described operations of the stopper pin 61, the torsion spring 63 and the torsion spring 64 are securely implemented, there is a need that no matter how the slider 50 is moved, fore end portions of the torsion spring 63 and the torsion spring 64 securely keep in contact with the stopper pin 61 as shown in FIG. 10.

Figure 11:
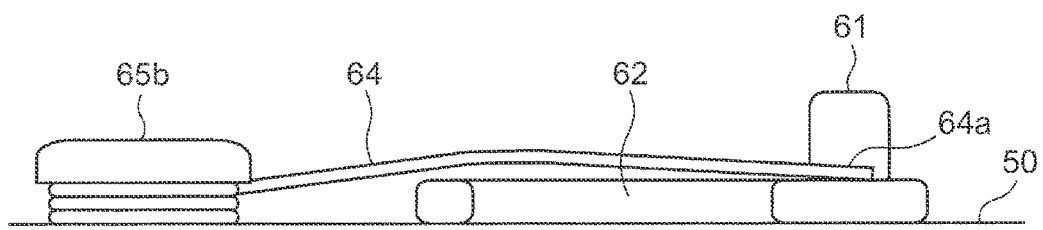
FIG. 11 is a side view of the torsion spring.

FIG. 11 is a side view of the torsion spring 64. As shown in FIG. 11, the torsion spring 64 has a base end portion wound around the screw 65b, an intermediate portion bent toward the mounting plate 62 side, and a fore end portion 64a biasing the surface of the mounting plate 62 made of resin. Thus, the fore end portion 64a of the torsion spring 64 is positioned at the root of the stopper pin 61 without fail. Therefore, even if the slider 50 is vibrated during movements, the fore end portion 64a of the torsion spring 64 is never separated apart from the stopper pin 61. This structure is the case also with the torsion spring 63.

As described above, in this embodiment, the damper 37 for opening and closing the second steam jet port 29a and the second duct portion 22 is provided in the second duct portion 22, and the actuating lever 49 projecting outward from the side panel 48 is swung in the up/down direction by the slider 50 so that the damper 37 is opened and closed via the rotating shaft 47. In this case, the torsion spring 63 and the torsion spring 64 for elastically biasing the actuating lever 49 along with the up/down movement of the slider 50 are provided on forward-and-backward both sides of the slider 50 in the swinging direction of the actuating lever 49.

Accordingly, when the damper 37 fully closes the second steam jet port 29*a*, the elastic force of the torsion spring 64 can be made to act on the actuating lever 49. Meanwhile, when the damper 37 fully closes the second duct portion 22, the elastic force of the torsion spring 63 can be made to act on the actuating lever 49. Therefore, even if there arises a positional gap between the center of the up/down movement range of the slider 50 and the center of the up/down movement range of the damper 37 during the assembly, any operational gap between the slider 50 and the damper 37 due to the positional gap can be absorbed by deformation of the torsion springs 63, 64.

That is, according to this embodiment, even if there arises a gap between the up/down movement range of the slider 50 and the up/down movement range of the damper 37 during the assembly, the damper 37 can fully close the second steam jet port 29*a* and the second duct portion 22. As a result, even in cases where the mounting position of the opening/closing mechanism for the damper 37 is varied among individual cooking devices, it is implementable to fulfill secure opening/closing operations of the damper 37.

In this connection, the second duct portion 22, inside which high-temperature superheated steam flows through, comes to high temperatures of 100° C. or higher. Therefore, the damper 37 itself, which is provided in the second duct portion 22, also comes to high temperatures. For this reason, there is a need that the damper switching motor 43 for opening and closing the damper 37 be installed at a position apart from the damper 37. Due to this, the mounting positions of the rotating shaft 47, the actuating lever 49, the slider 50, the slider mounting plate 52 and the like are varied among individual cooking devices. However, according to this embodiment, even if there arises a gap between the up/down movement range of the slider 50 and the up/down movement range of the damper 37 due to the variations in the mounting positions as described above, it is implementable to fulfill secure opening/closing operations of the damper 37.

Furthermore, the actuating lever 49 is biased by the torsion springs 63, 64. Therefore, an impact upon contact of the projective portion 37*a* of the damper 37 against the wall surface of the heating chamber 13 can be absorbed by elastic force of the torsion spring 64, by which collision noise of the damper 37 against the wall surface of the heating chamber 13 can be reduced. Also, an impact upon contact of the fore end edge 37*b* of the damper 37 against the inner surface of the second duct portion 22 can be absorbed by elastic force of the torsion spring 63, by which collision noise of the damper 37 against the wall surface of the second duct portion 22 can be reduced.

Furthermore, the actuating lever 49 is biased by the torsion springs 63, 64. Therefore, even if the damper 37 is in contact with the wall surface of the heating chamber 13 or the inner surface of the second duct portion 22 at places near the top dead center and the bottom dead center of the pin 60 of the disc 59, the slider 50 can continue to be moved up or down by virtue of deformation of the torsion springs 63, 64. Thus, overloads on the damper switching motor 43 and resultant occurrence of seizures can be prevented.

Also, in this embodiment, the reciprocating part is implemented by the plate-shaped slider 50 having a cam mechanism for converting rotational motion of the damper switching motor 43 to up/down motion. Thus, the reciprocating part can be made thinner in thickness and smaller in size enough to be installed even in a narrow space beside the heating chamber 13.

In this embodiment, the torsion springs 63, 64 are employed as the elastic members for making elastic force act on the actuating lever 49. Therefore, the reciprocating part formed thinner in thinness by using the slider 50 can be prevented from being thickened by the elastic members.

Also in this embodiment, the stopper pin 61 is provided between the upper-side torsion spring 63 and the lower-side torsion spring 64 so as to fulfill the positioning for positions where the torsion springs 63, 64 act on the actuating lever 49. Therefore, the timing at which the torsion springs 63, 64 act on the actuating lever 49 can be set to an optimum timing for the damper 37 to open and close the second steam jet port 29*a* or the second duct portion 22.

Also in this embodiment, the torsion springs 63, 64 are bent at their intermediate portions toward the mounting plate 62 side so that the fore end portions 64*a* bias the mounting plate 62 made of resin. Therefore, the fore end portions 64*a* of the torsion springs 63, 64 can securely be positioned at the root of the stopper pin 61. As a result, even if the slider 50 is vibrated during movements, the fore end portions 64*a* of the torsion springs 63, 64 are never separated apart from the stopper pin 61, so that operations of the stopper pin 61, the torsion spring 63 and the torsion spring 64 can securely be fulfilled.

In this embodiment, the cam mechanism is made up of the disc 59 having the pin 60 and the slot 58 of the slider 50. However, without being limited to this, the cam mechanism in this invention may also be made up of a cam and a cam follower. Moreover, a crank mechanism may well be used instead of the cam mechanism.

Also in this embodiment, the reciprocating part is made up of the damper switching motor 43 and the slider 50. However, without being limited to this, the reciprocating part in this invention may also be implemented, for example, by a solenoid actuator.

Also in this embodiment, the opening/closing mechanism is made up of the rotating shaft 47, the actuating lever 49, the slider 50, the disc 59, the torsion spring 63, the torsion spring 64, the slider mounting plate 52 and the like. However, without being limited to this, the opening/closing mechanism in this invention may be changed, as required, within the scope of the invention without problems at all.

Also in this embodiment, the surface of the mounting plate 62 is biased by the fore end portions 64*a* of the torsion springs 63, 64, so that the fore end portions 64*a* of the torsion springs 63, 64 are kept from separating apart from the stopper pin 61. However, without being limited to this, it is allowable in this invention that a guide extending horizontally in the top portion of the stopper pin 61, as an example, is provided, so that the fore end portions 64*a* of the torsion springs 63, 64 are prevented by this guide from separating apart from the stopper pin 61.

This embodiment has been described on a case where the damper opening/closing mechanism of this invention is applied to cooking devices. However, without being limited to applications to cooking devices, the invention is applicable to all of dampers for opening and closing a flow passage of fluid. In particular, as described above, in applications to dampers for opening and closing a flow passage of a heating medium, great effects can be produced because the opening/closing mechanism is installed at a position apart from the damper, which comes to high temperatures, and as a result, the mounting position of the opening/closing mechanism would be varied among individual devices.

REFERENCE SIGNS LIST 1 casing
12 steam generator
13 heating chamber
14 circulation unit
17 circulation fan
19 steam duct
20 first duct portion
21 bent portion
22 second duct portion
23 superheated steam generation heater
28 first steam jet port
29a, 29b, 29c, 29d second steam jet port
30 tray
31 heating object
37 damper
37a projective portion of damper
37b fore end edge of damper
43 damper switching motor
47 rotating shaft
48 side panel
49 actuating lever
50 slider
56 elongate hole
57, 65a, 65b screw
58 slot
60 pin
61 stopper pin
62 mounting plate
63, 64 torsion spring

The invention claimed is:

1. A damper opening/closing mechanism comprising:
a damper which swings about a shaft to open and close a flow passage;
an actuating lever connected to the shaft to swing the damper about the shaft;
a reciprocating part which reciprocates in alternate rectilinear directions;
an opening in the reciprocating part receiving the actuating lever;
torsion springs attached to the reciprocating part and positioned on opposite sides of the actuating lever received in said opening, said torsion springs being configured to elastically bias the actuating lever in the direction of motion of the reciprocating part; and
a single stationary stopper pin on said reciprocating part and configured to position the torsion springs at positions spaced from the actuating lever on opposite sides of the actuating lever when the actuating lever is inserted into the opening, said actuating lever being driven solely by contact with only one of said torsion springs upon rectilinear movement of said reciprocating part.

2. The damper opening/closing mechanism as claimed in claim 1, wherein
the reciprocating part is a slider which moves in alternate rectilinear directions,
further comprising guide portions for guiding the rectilinear motion of the slider.

3. The damper opening/closing mechanism as claimed in claim 2, further comprising
a motor, and a cam mechanism for converting rotational motion of a shaft of the motor into reciprocating motion of the slider in a rectilinear direction of the slider.

4. The damper opening/closing mechanism as claimed in claim 1, wherein
the torsion springs bias the body of the reciprocating part so as to be kept from separating apart from the stopper pin in an axial direction of the stopper pin.

5. A cooking device comprising:
a heating chamber for accommodating and heating a heating object to be heated;
a heating medium generation part for generating a heating medium to be supplied to the heating chamber;
a flow passage through which the heating medium flows; and
the damper opening/closing mechanism as defined in claim 1, wherein
the damper of the damper opening/closing mechanism opens and closes the flow passage.

* * * * *